United States Patent
Hopkins et al.

(10) Patent No.: US 7,690,390 B2
(45) Date of Patent: Apr. 6, 2010

(54) ARCHED CANOPY SYSTEM

(76) Inventors: Melvin Allen Hopkins, 2420 Butternut Ct., Dunedin, FL (US) 34698; Linda Susan Hopkins, 2420 Butternut Ct., Dunedin, FL (US) 34698

(*) Notice: Subject to any disclaimer, the term of this patent is extended or adjusted under 35 U.S.C. 154(b) by 0 days.

(21) Appl. No.: 12/008,270

(22) Filed: Jan. 10, 2008

(65) Prior Publication Data

US 2009/0090405 A1 Apr. 9, 2009

Related U.S. Application Data

(60) Provisional application No. 60/978,038, filed on Oct. 5, 2007.

(51) Int. Cl.
E04H 15/06 (2006.01)
(52) U.S. Cl. .................................................. 135/88.03
(58) Field of Classification Search ................. 135/125, 135/88.01, 88.03, 88.04; 280/304.3, 288.4, 280/727
See application file for complete search history.

(56) References Cited

U.S. PATENT DOCUMENTS

| | | | | |
|---|---|---|---|---|
| 4,295,481 A | | 10/1981 | Gee | |
| 4,560,196 A | * | 12/1985 | Carter, Sr. | 296/102 |
| 4,683,900 A | * | 8/1987 | Carmichael | 135/88.01 |
| 5,135,281 A | * | 8/1992 | Pappalardo | 297/184.15 |
| 5,720,312 A | * | 2/1998 | Scheuermann | 135/88.09 |
| 5,927,311 A | * | 7/1999 | Jager | 135/124 |
| 6,019,112 A | * | 2/2000 | Matlock | 135/124 |
| 6,227,557 B1 | * | 5/2001 | Perret | 280/288.4 |
| 6,799,593 B2 | | 10/2004 | Kendro, Jr. | |
| 7,059,660 B1 | * | 6/2006 | Juola | 296/163 |
| 7,255,121 B2 | * | 8/2007 | Milner et al. | 135/88.01 |
| 2002/0014755 A1 | | 2/2002 | Black | |
| 2003/0106577 A1 | * | 6/2003 | Martinez | 135/125 |
| 2004/0050410 A1 | * | 3/2004 | DeLong | 135/88.13 |
| 2008/0048413 A1 | * | 2/2008 | Salinas et al. | 280/304.3 |

* cited by examiner

*Primary Examiner*—David Dunn
*Assistant Examiner*—Noah Chandler Hawk

(57) ABSTRACT

A frame is formed of two laterally spaced rods. The rods have forward ends and rearward ends. The frame has a plurality of cross tubes. The cross tubes have opposed ends. The opposed ends are coupled to the rods. Forward retaining components couple the forward ends of the rods to a vehicle forwardly. Rearward components couple the rearward ends of the straps to a vehicle rearwardly. A flexible canopy fabric has pockets receiving the rods and cross tubes.

2 Claims, 3 Drawing Sheets

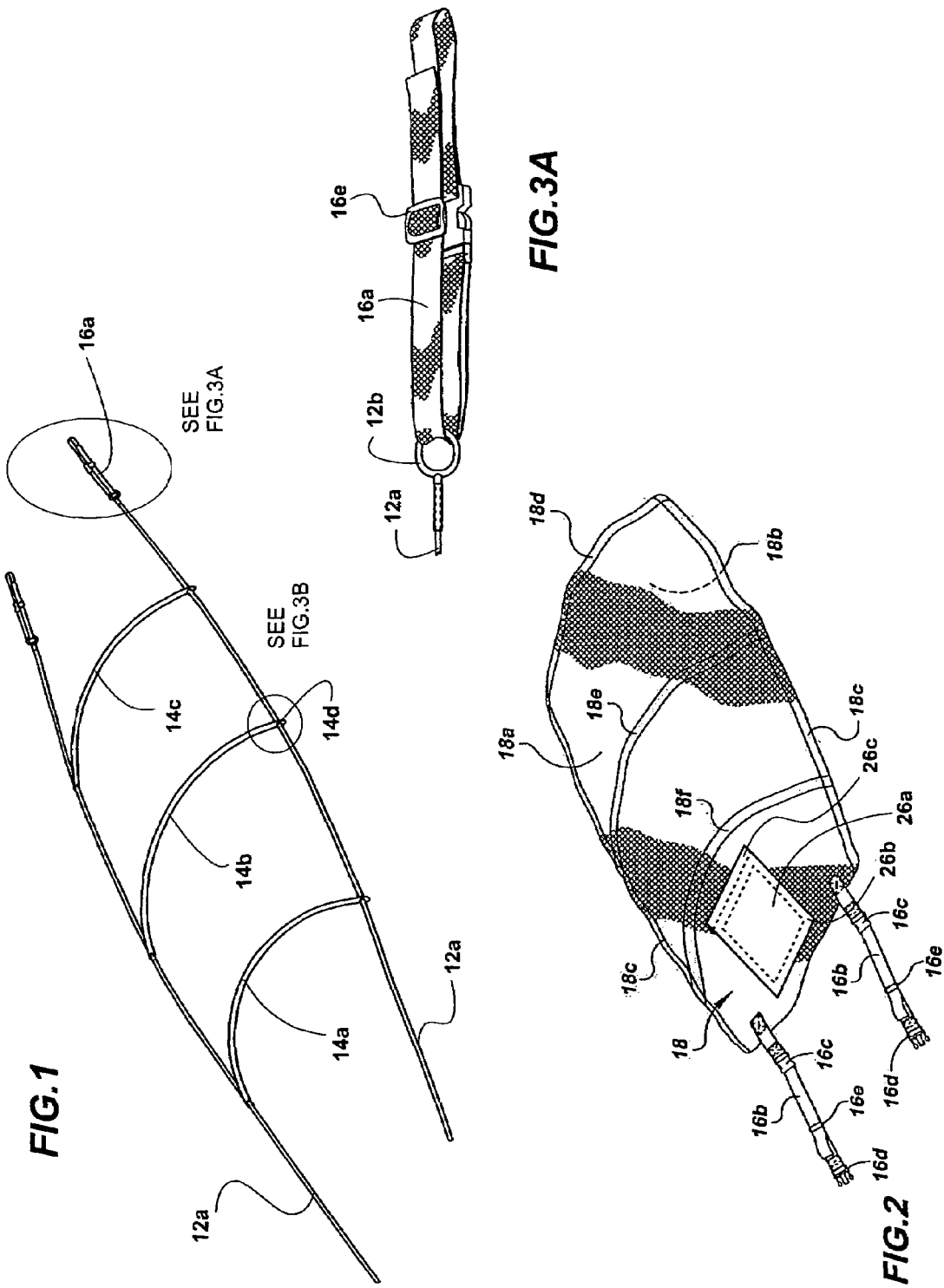

FIG3.B
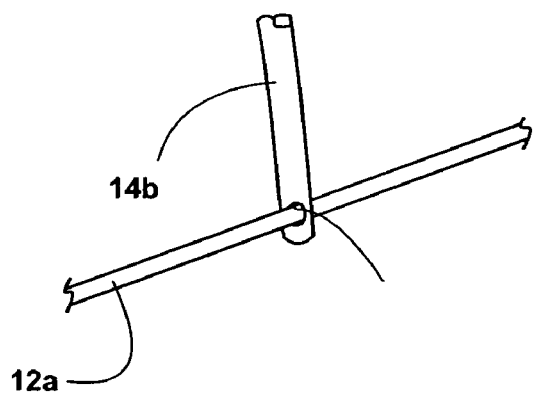
FIG.4
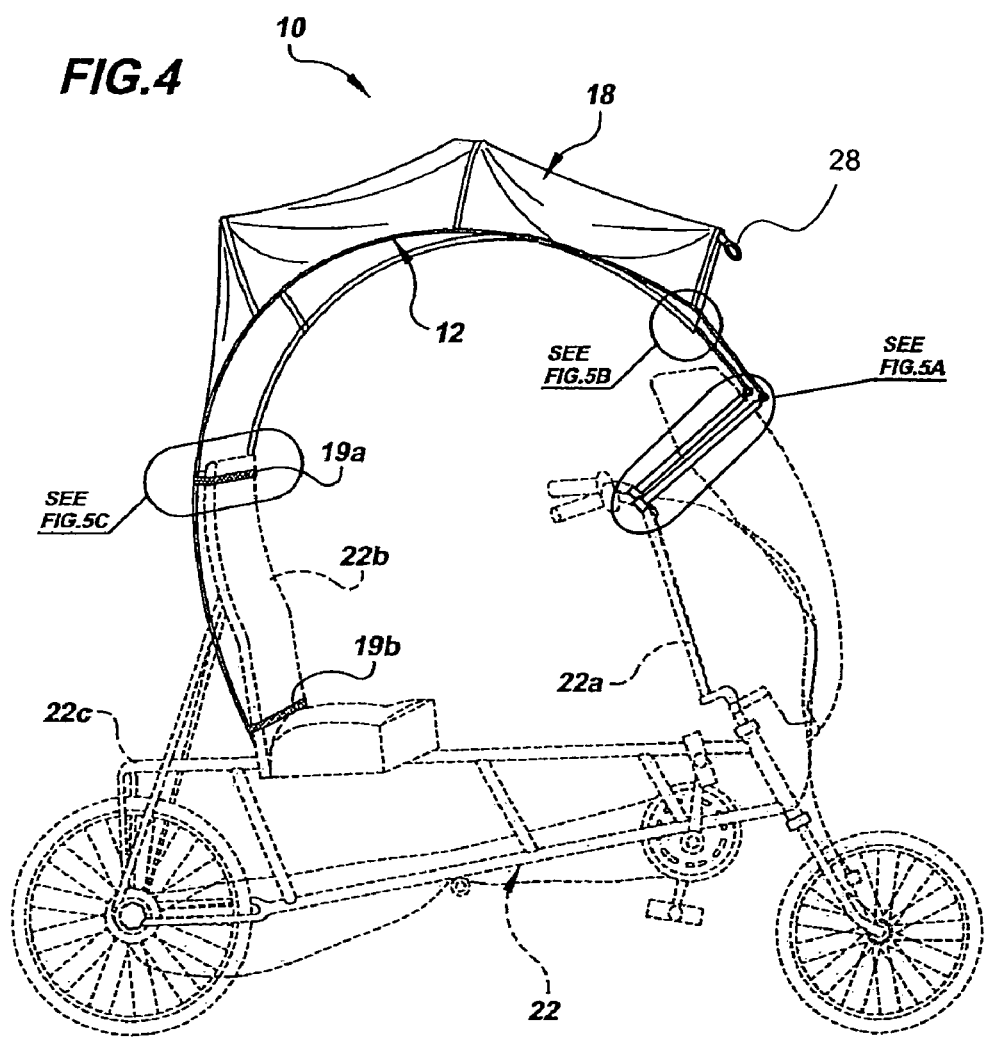

ARCHED CANOPY SYSTEM

RELATED APPLICATION

The present U.S. Non-Provisional Patent Application is based upon U.S. Provisional Patent Application No. 60/978,038 filed Oct. 5, 2007, the subject matter of which is incorporated herein by reference.

BACKGROUND OF THE INVENTION

1. Field of the Invention

The present invention relates to an arched canopy system and more particularly pertains to protecting a rider of a recumbent bicycle from sun and light rain in a safe, convenient and economical manner.

2. Description of the Prior Art

The use of coverings of known designs and configurations is known in the prior art. More specifically, coverings of known designs and configurations previously devised and utilized for the purpose of protecting a rider through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,295,481 issued Oct. 20, 1981 to Gee relates to a Convertible Sun Shade. U.S. Pat. No. 6,799,593 issued Oct. 5, 2004 relates to a Transportable Rotatable Weather Shield. Lastly, U.S. Patent Application Publication Number US 2002/0014755 relates to a Recumbent Vehicle and Apparatus for Forming Same.

While these devices fulfill their respective, particular objectives and requirements, the aforementioned patents do not describe an arched canopy system that allows for protecting a rider of a recumbent bicycle from sun and light rain in a safe, convenient and economical manner.

In this respect, the arched canopy system according to the present invention substantially departs from the conventional concepts and designs of the prior art, and in doing so provides an apparatus primarily developed for the purpose of protecting a rider of a recumbent bicycle from sun and light rain in a safe, convenient and economical manner.

Therefore, it can be appreciated that there exists a continuing need for a new and improved arched canopy system which can be used for protecting a rider of a recumbent bicycle from sun and light rain in a safe, convenient and economical manner. In this regard, the present invention substantially fulfills this need.

SUMMARY OF THE INVENTION

In view of the foregoing disadvantages inherent in the known types of coverings of known designs and configurations now present in the prior art, the present invention provides an improved arched canopy system. As such, the general purpose of the present invention, which will be described subsequently in greater detail, is to provide a new and improved arched canopy system and method which has all the advantages of the prior art and none of the disadvantages.

To attain this, the present invention essentially comprises an arched canopy system. First provided is a recumbent bicycle. The bicycle has handles. The handles have essentially vertical bars. The vertical bars are provided forwardly. The bicycle has an essentially vertical seat. The seat is provided rearwardly. The seat has an upper extent. The seat also has a lower extent.

A canopy frame is provided. The frame has two laterally spaced fiberglass rods. The rods have limited flexibility. The rods have forward ends. The forward ends have rigid rings. The rings are positioned forwardly of the vertical bars. The rods have rearward ends. The rearward ends are positioned rearwardly of the seat. The frame has three cross tubes. The cross tubes include a front cross tube. The cross tubes include a middle cross tube. The cross tubes further include a rear cross tube. Each of the cross tubes has opposed ends. Each opposed end has an aperture. The aperture receives the rods at space locations along the rods.

Provided next are forward retaining straps. Each forward retaining strap adjustably encompasses a bar of the bicycle. Each forward retaining strap receives a rigid ring. The rigid ring is provided at a forward end of a rod. A rearward lower retaining strap is provided. The lower retaining strap adjustably encompasses the lower extent of the seat and the rearward ends of the rods. A rearward upper retaining strap 19a is also provided. The rearward upper retaining strap adjustably encompasses the upper extent of the seat and the rods at a location spaced above the lower extent of the seat. The upper and lower retaining straps have sewn in loops. The loops hold the side rods in an arcuate configuration above the bicycle. The highest points of the side rod are located between the middle and rear cross tubes.

A flexible canopy fabric is provided. The fabric is in a generally rectangular configuration. The fabric has a front edge. The front edge has an adjacent front pocket. The front pocket receives the front cross tube. The fabric has a parallel middle pocket. The middle pocket receives the middle cross tube. The fabric has a parallel rearward edge. The rearward edge has an adjacent rearward pocket. The rearward edge receives the rear cross tube. The fabric further includes parallel side edges. The side edges form parallel side pockets. The side pockets receive the side rods between the front and rear cross tubes.

Further provided is a rectangular viewing panel. The viewing panel is formed in the canopy fabric between the rear cross tube and the rear edge. The viewing panel is fabricated of a mesh. The mesh has interstices of sufficient size to allow viewing objects behind the bicycle for safety purposes. The viewing panel also includes a rectangular covering panel. The covering panel is fabricated of a flexible opaque material. The covering panel is of a size to cover the viewing panel. The covering panel has an upper edge. The upper edge has a strip of hook and loop fasteners. An associated strip of hook and loop fastener is provided adjacent to the rear cross tube. The associated strip of hook and loop fasteners is adapted to hold the covering panel over the viewing panel at the discretion of a rider of the bicycle.

Provided last is a finger ring. The finger ring is coupled to the front edge of the canopy cover. The finger ring is adapted to receive a finger of a rider of the bicycle and pull the front cross tube and canopy cover and side rods forwardly for protection purposes. The front cross tube and canopy cover and side rods are adapted to resiliently move rearwardly upon release of the finger ring by a rider of the bicycle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved arched canopy system which has all of the advantages of the prior art coverings of known designs and configurations and none of the disadvantages.

It is another object of the present invention to provide a new and improved arched canopy system which may be easily and efficiently manufactured and marketed.

It is further object of the present invention to provide a new and improved arched canopy system which is of durable and reliable constructions.

An even further object of the present invention is to provide a new and improved arched canopy system which is susceptible of a low cost of manufacture with regard to both materials and labor, and which accordingly is then susceptible of low prices of sale to the consuming public, thereby making such arched canopy system economically available to the buying public.

Even still another object of the present invention is to provide an arched canopy system for protecting a rider of a recumbent bicycle from sun and light rain in a safe, convenient and economical manner.

Lastly, it is an object of the present invention to provide a new and improved arched canopy system. A frame is formed of two laterally spaced rods. The rods have forward ends and rearward ends. The frame has a plurality of cross tubes. The cross tubes have opposed ends. The opposed ends are coupled to the rods. Forward retaining components couple the forward ends of the rods to a vehicle forwardly. Rearward components couple the rearward ends of the straps to a vehicle rearwardly. A flexible canopy fabric has pockets receiving the rods and cross tubes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the frame of the invention.

FIG. 2 is a perspective view of the fabric canopy of the invention.

FIG. 3A is an enlarged detail perspective view of the front end of the side rod and the connection to the strap.

FIG. 3B is an enlarged detail perspective view of the rear end side of the rod.

FIG. 4 is a side view showing how the frame and canopy are installed on the bicycle.

The same reference numerals refer to the same parts throughout the various Figures.

DESCRIPTION OF THE PREFERRED EMBODIMENT

Figure 5A:
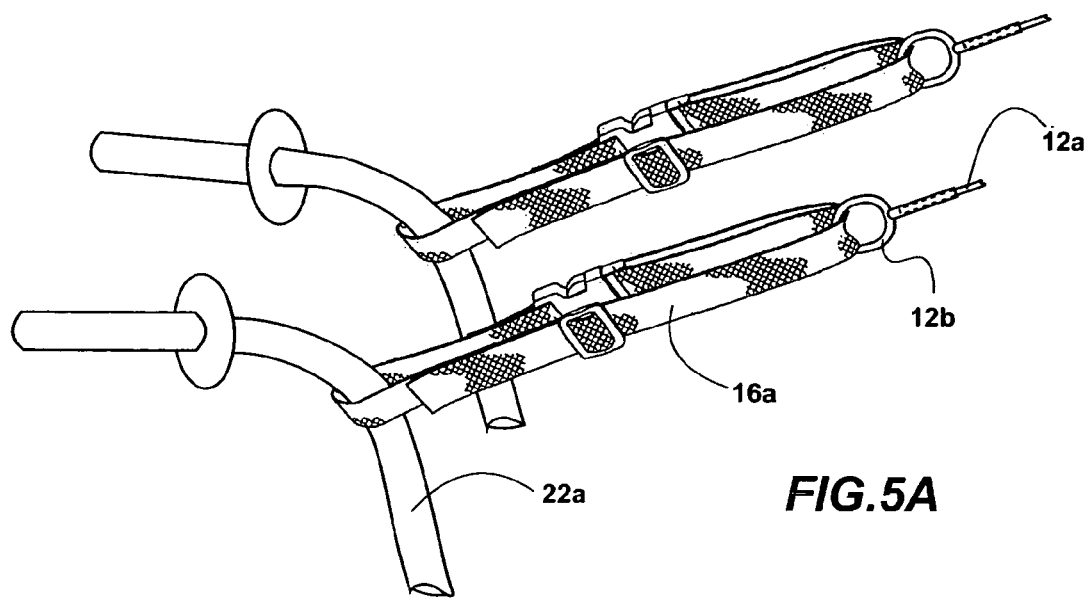
FIG. 5A is an enlarged detail perspective view showing how the front portion of the frame and canopy attaches to the handle bars of the bicycle.
Figure 5B:
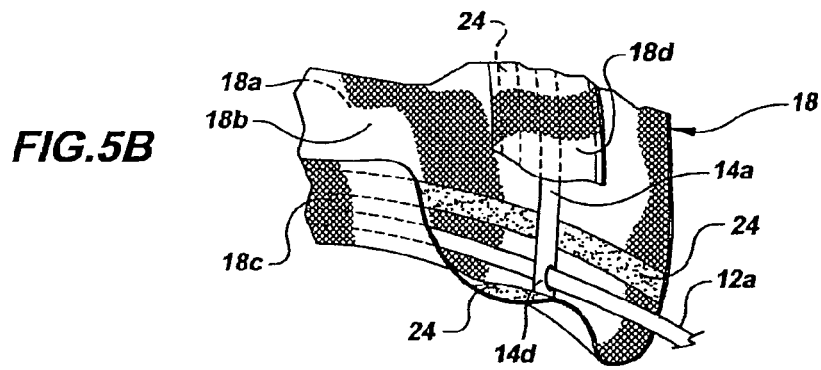
FIG. 5B is an enlarged detail perspective view showing how the canopy is connects to the frame.
Figure 5C:
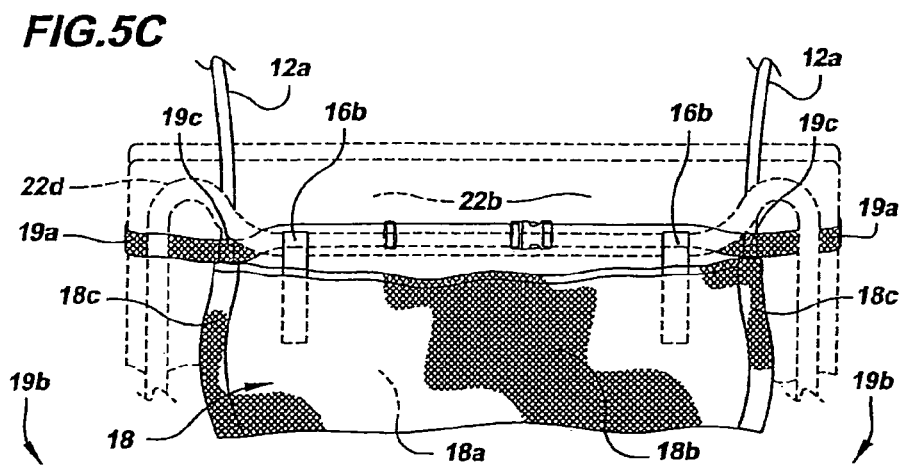
FIG. 5C is an enlarged detail rear plan view showing how the back portion of the frame and canopy attaches to the seat and seat frame of the bicycle.

With reference now to the drawings, and in particular to FIG. 1 thereof, the preferred embodiment of the new and improved arched canopy system embodying the principles and concepts of the present invention and generally designated by the reference numeral 10 will be described.

The present invention, the arched canopy system 10 is comprised of a plurality of components. Such components in their broadest context include a frame, forward retaining components and a flexible canopy fabric. Such components are individually configured and correlated with respect to each other so as to attain the desired objective.

First provided is a recumbent bicycle 22. The bicycle has handles 22a. The handles have essentially vertical bars. The vertical bars are provided forwardly. The bicycle has an essentially vertical seat 22b. The seat is provided rearwardly. The seat has an upper extent 22c. The seat also has a lower extent 22d.

A canopy frame 12 is provided. The frame has two laterally spaced fiberglass rods 12a. The rods have limited flexibility. The rods have forward ends. The forward ends have rigid rings 12b. The rings are positioned forwardly of the vertical bars. The rods have rearward ends. The rearward ends are positioned rearwardly of the seat. The frame has three cross tubes 14a, 14b, 14c. The cross tubes include a front cross tube 14a. The cross tubes include a middle cross tube 14b. The cross tubes further include a rear cross tube 14c. Each of the cross tubes has opposed ends. Each opposed end has an aperture 14d. The aperture receives the rods at space locations along the rods.

Provided next are forward retaining straps 16a. Each forward retaining strap adjustably encompasses a bar of the bicycle. Each forward retaining strap receives a rigid ring 12b. The rigid ring is provided at a forward end of a rod. A rearward lower retaining strap 19b is provided. The lower retaining strap adjustably encompasses the lower extent of the seat and the rearward ends of the rods. A rearward upper retaining strap 19a is also provided. The rearward upper retaining strap adjustably encompasses the upper extent of the seat and the rods at a location spaced above the lower extent of the seat. The upper and lower retaining straps have sewn in loops 19c. The loops hold the side rods in an arcuate configuration above the bicycle. The highest points of the side rod are located between the middle and rear cross tubes.

A flexible canopy fabric 18 is provided. The fabric is in a generally rectangular configuration. The fabric has a front edge. The front edge has an adjacent front pocket 18d. The front pocket receives the front cross tube. The fabric has a parallel middle pocket 18e. The middle pocket receives the middle cross tube. The fabric has a parallel rearward edge. The rearward edge has an adjacent rearward pocket 18f. The rearward edge receives the rear cross tube. The fabric further includes parallel side edges. The side edges form parallel side pockets 18c. The side pockets receive the side rods between the front and rear cross tubes.

Further provided is a rectangular viewing panel 26a. The viewing panel is formed in the canopy fabric between the rear cross tube and the rear edge. The viewing panel is fabricated of a mesh. The mesh has interstices of sufficient size to allow viewing objects behind the bicycle for safety purposes. The viewing panel also includes a rectangular covering panel 26b. The covering panel is fabricated of a flexible opaque material. The covering panel is of a size to cover the viewing panel. The covering panel has an upper edge. The upper edge has a strip of hook and loop fasteners 26c. An associated strip of hook and loop fastener is provided adjacent to the rear cross tube. The associated strip of hook and loop fasteners is adapted to hold the covering panel over the viewing panel at the discretion of a rider of the bicycle.

Provided last is a finger ring 28. The finger ring is coupled to the front edge of the canopy cover. The finger ring is adapted to receive a finger of a rider of the bicycle and pull the front cross tube and canopy cover and side rods forwardly for protection purposes. The front cross tube and canopy cover and side rods are adapted to resiliently move rearwardly upon release of the finger ring by a rider of the bicycle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The overall invention is an arched canopy system 10 for a recumbent bicycle for sun and light rain protection. The invention provides protection from the sun while giving an aerodynamic appearance to the bicycle to which it is attached. The frame 12 is attached to the seat 22b by means of upper and lower retaining straps 19a and 19b. Each strap has a sewn in loops 19c that fits around the two side rods 12a. The loops of the lower straps have a closed bottom for contacting the rear end of a received side rod. The retaining straps 19a and 19b go around the seat 22b and buckle in the back. The fabric canopy 18 is attached to the seat frame 22d by means of rear straps 16b behind the rear of the seat 22b of bicycle 22. The frame 12 and fabric canopy 18 are pulled forward and attached and adjusted tight with straps 16a to the mounting bar 20 which is attached to the handle bars 22a. This forms an arched cover over the bicycle riders head blocking most sun and light rain.

The components of frame 12 consist of two 5/16 inch flexible fiberglass side rods 12a, a front middle and rear 3/8 inch flexible hollow PVC cross tubes 14a, 14b, and 14c, they are connected to the side rods using holes 14d. The front ends of the side rods where nylon front straps 16a are attached include rings 12b. The fabric canopy 18 which is made from nylon material and custom made to fit the frame 12. The fabric canopy 18 has hook and loop pockets 18c, 18d, 18e, and 18f which allow the frame 12 to fit together to form the bicycle cover. The fabric canopy 18 also has rear strap 16b sewn to the back of the canopy for attachment to the bicycle 22. All the components of the invention can be made from other materials as well as custom made.

The components of the system and the reference numbers in the various Figures are as follows:

12 is the overall frame.
12a are the two 5/16 inch by 77 inches flexible fiberglass outer side rods of frame 12.
12b are rings with crimps coupling to the front ends of the side rods.
14a is the front 3/8 inch flexible hollow PVC cross tube of frame 12.
14b is the middle 3/8 inch flexible hollow PVC cross tube of frame 12.
14c is the rear 3/8 inch flexible hollow PVC cross tube of frame 12.
14d are holes on the cross tubes that allow the side rods to pass through.
16a are the two 24 inch nylon front straps attached to the front ends of the two flexible solid fiberglass outer side rods 12a.
16b are the two 24 inch nylon rear straps sewn directly to the rear end of the canopy 18.
16c is the female portion of the quick disconnecting clip of the front and rear nylon straps 16a and 16b.
16d is the male portion of the quick disconnecting clip of the front and rear nylon straps 16a and 16b.
16e is the length adjustment clip of the front and rear nylon straps 16a and 16b.
18 is the fabric canopy.
18a is the top of the fabric canopy 18.
18b is the bottom of the fabric canopy 18.
18c are the side pockets which hold the side rods 12a of frame 12 to the fabric canopy 18 by means of hook and loop fasteners 24.
18d is the front pocket, which holds the front cross tube 14a of frame 12 to the fabric canopy 18 by means of hook and loop fasteners 24.
18e is the middle pocket, which holds the middle cross tube 14b of frame 12 to the fabric canopy 18 by means of hook and loop fasteners 24.
18f is the rear pocket, which holds the rear cross tube 14c of frame 12 to the fabric canopy 18 by means of hook and loop fasteners 24.
19a is the upper retaining strap that holds frame to seat 22b.
19b is the lower retaining strap that holds frame to seat 22b.
19c are the sewn in loops within the upper and lower retaining straps 19a, 19b that attach and hold frame 12a.
22 is the bicycle.
22a are the handle bars of bicycle 22.
22b is the seat of bicycle 22.
22c is the frame of bicycle 22.
22d is the seat frame of bicycle 22.
24 are the hook and loop fasteners.
26a is mesh viewing panel.
26b is a cover panel for the mesh viewing panel.
26c are the hook and loop fasteners on the top of the fabric canopy.
28a is a finger hole.

In the preferred embodiment, the main skeleton is made up of two flexible fiberglass rods 5/16 inch in diameter and 77 inches long. The rods can be in several sections joined or two pieces, 77 inches each. These rods run parallel with the bike on the two sides of the frame. Connecting the side rods together are three arched tubes ⅜ inch outside diameter of a bendable material that will retain the arch they are shaped in. The arched rods are attached to the side rods at a 90 degree angle using holes. This forms a three ribbed frame to support the cloth cover. The front end of the rod includes a ring secured with a crimp. On the front of the side rods, rings are attached and coupled to nylon straps 24 inches long with nylon buckles forming a loop receiving a ring. The straps are attached to the handlebars or around the frame using an extender strap. The back mounting straps are made from the same material as the front tie down straps, woven nylon strapping with nylon snap buckles. They wrap around the back of the seat frame and have two loops sewn into each. Each loop on the back mounting straps are the size to fit the diameter of the side rods of the frame.

The canopy is made of a nylon material custom fit to the frame using hook and loop fasteners for the attachment around the frame pieces.

Each of the frame components are put together to form a semi rigid support for the material to be stretched over thus forming a cover for the rider of the bicycle.

The two side rods are preferably solid rods with attachments adhered to the ends to attach the tie down straps. The material of the canopy is made of any type cloth, vinyl, flexible plastic, flexible product, etc. The strapping and buckles be of any material used to attach one piece to another, string, cord, rope nylon, cotton, rayon or any mixture to create an attaching device.

The main use of the present invention is as a top for recumbent bicycles and the like although use on a wide variety of other vehicles is intended.

What is claimed as being new and desired to be protected by Letters Patent of the United States is as follows:

1. An arched canopy and vehicle system comprising:
   a vehicle having components forwardly and an essentially vertical seat rearwardly, the seat having an upper extent and a lower extent;
   a frame formed of two laterally spaced rods having forward ends and rearward ends with a front cross tube, a middle cross tube and a rear cross tube, each cross tube having opposed ends coupled to the rods;
   forward retaining components for coupling the forward ends of the rods to the vehicle forwardly and rearward retaining components for attaching the rearward ends of the rods to the seat of the vehicle rearwardly;
   a flexible canopy fabric in a generally rectangular configuration with a front edge and an adjacent front pocket receiving the front cross tube and a parallel middle pocket receiving the middle cross tube and a parallel rearward edge with an adjacent rearward pocket receiving the rear cross tube, the front pocket being of a length essentially equal to the length of the front cross tube, the middle pocket being of a length essentially equal to the length of the middle cross tube, the rearward pocket being of a length essentially equal to the length of the rear cross tube, the canopy fabric also having parallel side edges forming parallel side pockets receiving the side rods between the front and rear cross tubes, the side pockets being of a length essentially equal to the length of the side rods, the side pockets also receiving the spaced intersecting locations;
   a rectangular viewing panel formed in the canopy fabric between the rear cross tube and the rear edge, the viewing panel being fabricated of a mesh with interstices of sufficient size to allow viewing objects behind the bicycle for safety purposes, the viewing panel also including a rectangular covering panel of flexible opaque material of a size to cover the viewing panel, the covering panel having an upper edge with a strip of hook and loop fasteners and an associated strip of hook and loop fasteners adjacent to the rear cross tube adapted to hold the covering panel over the viewing panel at the discretion of a rider of the bicycle; and
   a finger ring coupled to the front edge of the canopy cover at the forward-most extent of the canopy fabric, the finger ring adapted to receive a finger of a rider of the bicycle and pull the front cross tube and canopy cover and side rods forwardly for protection purposes, the front cross tube and canopy cover and side rods adapted to resiliently move rearwardly upon release of the finger ring by the rider of the bicycle.

2. An arched canopy and bicycle system for protecting a rider of a recumbent bicycle from sun and light rain in a safe, convenient and economical manner comprising, in combination:
   a recumbent bicycle having handles with essentially vertical bars forwardly and an essentially vertical seat rearwardly, the seat having an upper extent and a lower extent;
   a canopy frame formed of two laterally spaced fiberglass rods with limited flexibility and having forward ends with rigid rings positioned forwardly of the vertical bars, the rods having rearward ends attached directly to the seat and positioned rearwardly of the seat with three cross tubes, a front cross tube and a middle cross tube and a rear cross tube above the seat, each of the cross tubes having opposed ends with each end having an aperture receiving the rods at spaced intersecting locations along the rods;
   forward retaining straps, each forward retaining strap adjustably encompassing a bar of the bicycle, each forward retaining strap receiving a rigid rings at a forward end of a rod, a rearward lower retaining strap adjustably encompassing the lower extent of the seat and the rearward ends of the rods, a rearward upper retaining strap adjustably encompassing the upper extent of the seat and the rods at a location spaced above the lower extent of the seat, the upper and lower retaining straps having sewn in loops holding the side rods in an arcuate configuration above the bicycle with the highest points of the side rod being located between the middle and rear cross tubes;
   a flexible canopy fabric in a generally rectangular configuration with a front edge and an adjacent front pocket receiving the front cross tube and a parallel middle pocket receiving the middle cross tube and a parallel rearward edge with an adjacent rearward pocket receiving the rear cross tube, the front pocket being of a length essentially equal to the length of the front cross tube, the middle pocket being of a length essentially equal to the length of the middle cross tube, the rearward pocket being of a length essentially equal to the length of the rear cross, tube, the canopy fabric also having parallel side edges forming parallel side pockets receiving the side rods between the front and rear cross tubes, the side pockets being of a length essentially equal to the length of the side rods, the side pockets also receiving the spaced intersecting locations;
   a rectangular viewing panel formed in the canopy fabric between the rear cross tube and the rear edge, the viewing panel being fabricated of a mesh with interstices of sufficient size to allow viewing objects behind the bicycle for safety purposes, the viewing panel also including a rectangular covering panel of flexible opaque material of a size to cover the viewing panel, the covering panel having an upper edge with a strip of hook and loop fasteners and an associated strip of hook and loop fastener adjacent to the rear cross tube adapted to hold the covering panel over the viewing panel at the discretion of a rider of the bicycle; and a finger ring coupled to the front edge of the canopy cover at the forward-most extent of the canopy fabric, the finger ring adapted to receive a finger of a rider of the bicycle and pull the front cross tube and canopy cover and side rods forwardly for protection purposes, the front cross tube and canopy cover end side rods adapted to resiliently move rearwardly upon release of the finger ring by a rider of the bicycle.

* * * * *